(12) United States Patent
Min et al.

(10) Patent No.: US 9,665,563 B2
(45) Date of Patent: May 30, 2017

(54) ANIMATION SYSTEM AND METHODS FOR GENERATING ANIMATION BASED ON TEXT-BASED DATA AND USER INFORMATION

(75) Inventors: Wook Hee Min, Seoul (KR); Bo Gyeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 12/762,258

(22) Filed: Apr. 16, 2010

(65) Prior Publication Data

US 2010/0302254 A1 Dec. 2, 2010

(30) Foreign Application Priority Data

May 28, 2009 (KR) .................. 10-2009-0047161
Oct. 28, 2009 (KR) .................. 10-2009-0102590

(51) Int. Cl.
*G06T 13/00* (2011.01)
*G06F 17/27* (2006.01)
*G06F 17/21* (2006.01)
*G06T 13/80* (2011.01)

(52) U.S. Cl.
CPC ........ *G06F 17/2785* (2013.01); *G06F 17/214* (2013.01); *G06T 13/80* (2013.01)

(58) Field of Classification Search
CPC ..... G06T 13/80; G06F 9/4451; G06F 17/214; G06F 17/2785; G06Q 10/10; A63F 13/12; H04L 12/1822; H04M 3/56; H04M 3/567; H04M 7/0027; H04N 21/4122; H04N 7/15

See application file for complete search history.

(56) References Cited

U.S. PATENT DOCUMENTS 6,963,839 B1 * 11/2005 Ostermann et al. .......... 704/260
7,203,648 B1 4/2007 Ostermann et al.
7,248,677 B2 * 7/2007 Randall et al. ............ 379/93.23
(Continued)

FOREIGN PATENT DOCUMENTS

DE 10 2004 061884 7/2006
JP 2002-032306 A 1/2002
(Continued)

OTHER PUBLICATIONS

Machine translated KR, 10-20070035278, Pub date: Oct. 17, 2007; Kim_1020070035279_EngXlate.pdf.*
(Continued)

*Primary Examiner* — Sing-Wai Wu
(74) *Attorney, Agent, or Firm* — NSIP Law

(57) ABSTRACT

Animation devices and a method that may output text-based data as an animation, are provided. The device may be a terminal, such as a mobile phone, a computer, and the like. The animation device may extract one or more emotions corresponding to a result obtained by analyzing text-based data. The emotion may be based on user relationship information managed by a user of the device. The device may select an action corresponding to the emotion from a reference database, and combine the text-based data with the emotion and action to generate an animation script. The device may generate a graphic in which a character is moved based on the action information, the emotion information, and the text-based data.

37 Claims, 12 Drawing Sheets

(56) References Cited

U.S. PATENT DOCUMENTS

| | | | |
|---|---|---|---|
| 7,386,799 B1* | 6/2008 | Clanton et al. ............... 715/758 |
| 2003/0110149 A1* | 6/2003 | Wen et al. ...................... 706/55 |
| 2005/0158037 A1* | 7/2005 | Okabayashi et al. ........... 386/96 |
| 2008/0188210 A1* | 8/2008 | Choi .................... G04G 9/0076 455/414.3 |
| 2009/0125806 A1 | 5/2009 | Chiu et al. |
| 2009/0158308 A1* | 6/2009 | Weitzenfeld et al. .......... 725/10 |
| 2009/0278851 A1* | 11/2009 | Ach et al. ..................... 345/473 |

FOREIGN PATENT DOCUMENTS

| | | | |
|---|---|---|---|
| JP | 2005-216087 A | | 8/2005 |
| JP | 2006-155494 | * | 6/2006 ............. G06T 15/70 |
| JP | 2006-330958 A | | 12/2006 |
| JP | 2007-265092 | | 10/2007 |
| JP | 2008-070984 A | | 3/2008 |
| JP | 2008-097261 A | | 4/2008 |
| KR | 10-2004-0091331 | | 10/2004 |
| KR | 10-2006-0121679 A | | 11/2006 |
| KR | 10-2007-0018843 A | | 2/2007 |
| KR | 10-2007-0114082 A | | 11/2007 |
| KR | 10-2008-0004196 | | 1/2008 |
| KR | 10-2008-0020714 | | 3/2008 |
| KR | 10-2008-0102035 | | 11/2008 |
| KR | 10-2009-0003521 | | 1/2009 |
| WO | WO 02/080107 A1 | | 10/2002 |

OTHER PUBLICATIONS

Machine Translated: JP,2002-032306, Tosa Naoko, Jan. 31, 2002.*
Machine Translated: JP,2006-330958, Sato Noriyuki, Ishikawa Kazuhiro and Inoue Seiji, Dec. 7, 2006.*
Machine Translated: JP,2008-070984, Miwa Tetsuya and Arimoto Yukiro, Mar. 27, 2008.*
Machine translated Japanese Publication by Wakabayashi Tsukimi, JP2000-207214.*
Mumtaz Begum et al., "Prosody generation by integrating rule and template-based approaches for emotional Malay speech synthesis", TENCON 2008, IEEE Region 10 Conference, Nov. 19, 2008, pp. 1-6, IEEE, Piscataway, NJ, USA.
European Search Report issued on Mar. 31, 2011 in corresponding European Application No. EP 10 16 2474 (9 pages).
Japanese Office Action issued by the Japanese Patent Office on Jan. 28, 2014 for the corresponding Japanese Application No. 2010-119251, (5 pages in Japanese).
Korean Office Action issued by the Korean Patent Office on Jun. 26, 2015, for the corresponding Korean Patent Application No. 10-2009-0102590, 9 pages in English, 8 Pages in Korean.

* cited by examiner

FIG. 12

| Text-based data | Sender | who | when | what | how | predicate | Emotion of words | Inferred emotion | Combination of emotion |
|---|---|---|---|---|---|---|---|---|---|
| I'm annoying by having a lot of homework to do today, so I'm sick of preparing the presentation | Friend (intimacy degree 5) | (Sender) | Today | homework | a lot of | Do | | Anger disgust | Contempt |
| | | | | | | Annoy | Annoyance | | |
| | | (Sender) | | Preparing of presentation | | Sick | Annoyance | | |

ANIMATION SYSTEM AND METHODS FOR GENERATING ANIMATION BASED ON TEXT-BASED DATA AND USER INFORMATION

CROSS-REFERENCE TO RELATED APPLICATION(S)

This application claims the benefit under 35 U.S.C. §119 (a) of Korean Patent Application No. 10-2009-0047161, filed on May 28, 2009, in the Korean Intellectual Property Office, and Korean Patent Application No. 10-2009-0102590, filed on Oct. 28, 2009, in the Korean Intellectual Property Office, the entire disclosure of each of which is incorporated herein by reference for all purposes.

BACKGROUND

1. Field

The following description generally relates to an animation system for generating animation based on text-based data, and more particularly, to an animation system which may extract an emotion from text-based data, select an action based on the emotion to generate an animation script, and generate an animation based on the animation script.

2. Description of Related Art

Recently, the development of communication technologies and functional improvements of handheld terminals, has led to an increase in the use of short message services (SMS) between users.

A user of a terminal tends to prefer SMS to a call service because of the relatively lower cost of SMS in comparison with a voice call. An example of a wired/wireless integration service that may combine advantages of the SMS and an E-mail service is a multimedia message system (MMS) that may include a message having moving pictures, photos, music files, and the like, as well as a simple text-based data. Currently, MMS is widely used by users of handheld terminals.

An existing method of expressing emotions of a message sender may be performed using a multimedia message, for example, a dynamic message, and/or through the use of emoticons obtained by combining special characters provided in the handheld terminal. Examples of emoticons include emoticons that are smiling, frowning, laughing, crying, angry, and the like. These emoticons are widely used in cyberspace due to an ease of expressing subtle emotions of a user, and an ease in understanding. Various emoticons including various expressions, developed by chat users, are stored in an improved mobile communication terminal, however, there are still limitations to express the various emotions.

In the above described existing methods, feelings of text-based data sender are not satisfactorily expressed, and a capacity of the multimedia message that may express emotions, mental state, and the like, of the message sender, is greater than that of the SMS.

SECOND LIFE® is considered an innovative contents service model that allows users the ability of self-expression and also allows revenue generation by contents creation. Users may re-create their identities using a two-dimensional avatar or a three-dimensional avatar in a virtual reality. SECOND LIFE® allows users to satisfy a desire for self-expression, and also allows a user to create, trade, and own various objects. Thus, the virtual reality may be re-created as a virtual market. SECOND LIFE® also allows users the ability to create virtual objects, while retaining copyright for any content they create.

However, participation in activities such as Second Life may require continuous attention to a user's own avatar in connection with a server. This may require a user to consume a considerable amount of time and energy. This also requires a continuous connection with a server.

SUMMARY

In one general aspect, there is provided an animation script generating device, including: an emotion extraction unit configured to extract, from a reference database, an emotion based on analyzing text-based data and corresponding user relationship information, a selection unit configured to select an action based on the extracted emotion, and a script generation unit configured to combine the text-based data with the emotion and action to generate an animation script.

The text-based data may include at least one of a Short Message Service (SMS) message, a text scenario including contents to be generated as moving pictures, an instant message, a text memo of a Social Network Service (SNS), and a text-based e-mail. The user relationship information may indicate a relationship or an intimacy degree between a generator of the text-based data and a receiver of the text-based data.

The animation script generating device may further include: a natural language processing unit configured to process words included in the text based data based on the analyzed text-based data, wherein the emotion extraction unit is further configured to: identify a character corresponding to the generator of the text-based data, and extract, from the reference database, the emotion corresponding to one or more words of the text-based data and the user relationship information. The animation script generating device may further include: an external data processing unit configured to generate a background image using at least one of sending time information of the text-based data, receiving time information of the text-based data, current time information, and weather information, wherein the script generation unit is further configured to generate the animation script including the background image. The reference database may include: a user profile database configured to store mapping information of the user relationship information corresponding to the generator of the text-based data and mapping information of a character corresponding to the receiver of the text-based data, an emotional vocabulary dictionary database configured to store mapping information of an emotion corresponding to vocabulary and the user relationship information, an emotional inference rule database configured to store mapping information of an emotion corresponding to one or more words of the text based data and the user relationship information, and an action rule database configured to store mapping information of an action corresponding to a user emotion and/or the user relationship information.

The emotion extraction unit may be further configured to: identify, in the user profile database, the character corresponding to the generator of the text-based data and the user relationship information, identify, in the emotional vocabulary dictionary database, an emotion corresponding to the vocabulary and the user relationship information, identify, in the to emotional inference rule database, an inferred emotion corresponding to the one or more words of the text-based data and the user relationship information, and combine the emotion and the inferred emotion to extract at least one user emotion. The action selection unit may be further configured to select, from the action rule database, the action corresponding to the at least one user emotion and the user relationship information. The reference database may further include: a production database configured to store mapping information of a camera work corresponding to at least one of the user relationship information, the at least one user emotion, the character, the action, and mapping information of a background sound. The animation script generating device may further include: a producing unit configured to identify the camera work and the background sound, in the production database, based on at least one of the user relationship information, the at least one user emotion, the character, and the action, wherein the script generation unit is further configured to generate the animation script using the camera work including the background sound.

In another general aspect, there is provided an animation outputting device, including: an analyzing unit configured to analyze information included in an animation script to identify emotional information, character, action information, and text-based data, a graphic generation unit configured to generate a graphic in which the character moves based on the action information, and an animation generation unit configured to output the generated graphic as an animation.

The text-based data may include at least one of a SMS message, a text scenario including contents to be generated as moving pictures, an instant message, a text memo of a SNS, and a text-based e-mail. The graphic generating unit may be further configured to generate the graphic including a text of the text-based data. The animation outputting device may further include: an audio processing unit configured to output the text-based data as a voice in which an intonation or a tone is applied according to the emotional information, wherein the animation generation unit is further configured to combine the generated graphic and the voice to output an animation. The animation outputting device may further include: an audio processing unit configured to output the background sound when the script analyzing unit verifies the background sound from the animation script, wherein the animation generation unit is further configured to combine the generated graphic and the background sound to output an animation.

In another general aspect, there is provided a receiving terminal, including: a reference database configured to store user relationship information, character information, and emotional information, and an animation script generating device configured to: extract an emotion based on analyzing received text-based data and corresponding user relationship information, to select an action corresponding to the emotion, and combine the text-based data with the emotion and the action to generate an animation script.

The text-based data may include at least one of a SMS message, a text scenario including contents to be generated as moving pictures, an instant message, a text memo of a SNS, and a text-based e-mail. The user relationship information may indicate a relationship or intimacy degree between a generator of the text-based data and a receiver of the text-based data. The receiving terminal may further include an animation outputting device configured to analyze the animation script to output an animation.

The reference database may include: a user profile database configured to store mapping information of the user relationship information corresponding to the generator of the text-based data and mapping information of a character corresponding to the receiver of the text-based data, an emotional vocabulary dictionary database configured to store mapping information of an emotion corresponding to vocabulary and the user relationship information, an emotional inference rule database configured to store mapping information of an emotion corresponding to one or more words of the text-based data and the user relationship information, and an action rule database configured to store mapping information of an action corresponding to a user emotion and the user relationship information.

The animation script generating device may include: a natural language processing unit configured to process words included in the text-based data based on the result obtained by analyzing the text-based data, an emotion extraction unit configured to: identify, in the user profile database, the character corresponding to the generator of the text-based data and the user relationship information, identify, in the emotional vocabulary dictionary database, an emotion corresponding to the vocabulary and the user relationship information, identify, in the emotional inference rule database, an inferred emotion corresponding to the one or more words of the text-based data and the user relationship information, and combine the emotion and the inferred emotion to extract at least one user emotion, an action selection unit configured to verify, from the action rule database, the action corresponding to the at least one user emotion and the user relationship information, and a script generation unit configured to combine the text-based data with the at least one user emotion and action to generate an animation script.

The animation script generating device may further include: an external data processing unit configured to generate a background image using at least one of sending time information of the text-based data, receiving time information of the text-based data, current time information, and weather information, wherein the script generation unit is further configured to generate the animation script including the background image. The reference database may further include: a production database configured to: store mapping information of a camera work corresponding to at least one of the user relationship information, the at least one user emotion, the character, and the action, and store mapping information of a background sound. The animation script generating device may further include: a producing unit configured to verify the corresponding camera work and the background sound, in the production database, using at least one of the user relationship information, the at least one user emotion, the character, and the action, wherein the script generation unit is further configured to generate the animation script using the camera work including the background sound.

In another general aspect, there is provided a sending terminal, including: a reference database configured to store user relationship information, character information, and emotional information, and an animation script generating device configured to: extract an emotion based on analyzing text-based data intended to be sent and corresponding user relationship information, select an action corresponding to the emotion, combine the text-based data with the emotion and the action to generate an animation script, and send the generated animation script to a receiving terminal.

The text-based data may include at least one of a SMS message, a text scenario including contents to be generated as moving pictures, an instant message, a text memo of a SNS, and a text-based e-mail. The user relationship information may indicate a relationship or intimacy degree between a generator and a receiver of the text-based data.

The reference database may include: a user profile database configured to store mapping information of the user relationship information corresponding to the generator of the text-based data and mapping information of a character corresponding to the receiver of the text-based data, an emotional vocabulary dictionary database configured to store mapping information of an emotion corresponding to vocabulary and the user relationship information, an emotional inference rule database configured to store mapping information of an emotion corresponding to one or more words of the text-based data and the user relationship information, and an action rule database configured to store mapping information of an action corresponding to a user emotion and the user relationship information.

The animation script generating device may include: a natural language processing unit configured to process an emotion of words included in the text-based data based on the result obtained by analyzing the text-based data, an emotion extraction unit configured to: identify, in the user profile database, the character corresponding to the generator of the text-based data and the user relationship information, identify, in the emotional vocabulary dictionary database, an emotion corresponding to the vocabulary and the user relationship information, identify, in the emotional inference rule database, an inferred emotion corresponding to the one or more words of the text-based data and the user relationship information, and combine the emotion and the inferred emotion to extract at least one user emotion, an action selection unit configured to verify, from the action rule database, the action corresponding to the at least one user emotion and the user relationship information, and a script generation unit configured to combine the text-based data with the at least one user emotion and action to generate an animation script.

The animation script generating device may further include: an external data processing unit configured to generate a background image using at least one of sending time information of the text-based data, receiving time information of the text-based data, current time information, and weather information, wherein the script generation unit is further configured to generate the animation script including the background image. The reference database may further include: a production database configured to store mapping information of a camera work corresponding to at least one of the user relationship information, the at least one user emotion, the character, the action, and mapping information of a background sound. The animation script generating device may further include: a producing unit configured to verify corresponding camera work and the background sound, in the production database, using at least one of the user relationship information, the at least one user emotion, the character, and the action, wherein the script generation unit is further configured to generate the animation script using the camera work including the background sound.

In another general aspect, there is provided a mobile terminal for generating an animation based on text-based data, the mobile terminal including: an emotion extraction unit configured to extract an emotion from text-based data generated by a first user, a selection unit configured to select at least one of a motion and a gesture, the motion and/or the gesture being based on relationship information of the first user and the extracted emotion, and a script generation unit configured to combine the emotion and at least one of the motion and the gesture, to generate an animation script.

In another general aspect, there is provided a sending terminal, including: a reference database configured to store user relationship information of one or more users, character information, and emotional information, and an animation script generating device configured to: receive text-based data from a sending terminal, extract an emotion based on analyzing text-based data and corresponding user relationship information, select an action based on the extracted emotion, combine the text-based data with the emotion and the action to generate an animation script, and send the generated animation script to a receiving terminal.

In another general aspect, there is provided an animation script generating method, including: extracting, a reference database, an emotion based on analyzing text-based data, and corresponding user relationship information, selecting an action from the reference database based on the extracted emotion, and combining the text-based data with the emotion and action to generate an animation script.

In another general aspect, there is provided an animation outputting method, including: analyzing information included in an animation script to identify emotional information, character, action information, and text-based data, generating a graphic in which the character moves based on the action information, and outputting the generated graphic as an animation.

Other features and aspects will be apparent from the following description, the drawings, and the claims.

BRIEF DESCRIPTION OF THE DRAWINGS

FIG. 12 is a table illustrating an example of language processing and emotion extraction.

Figure 1:
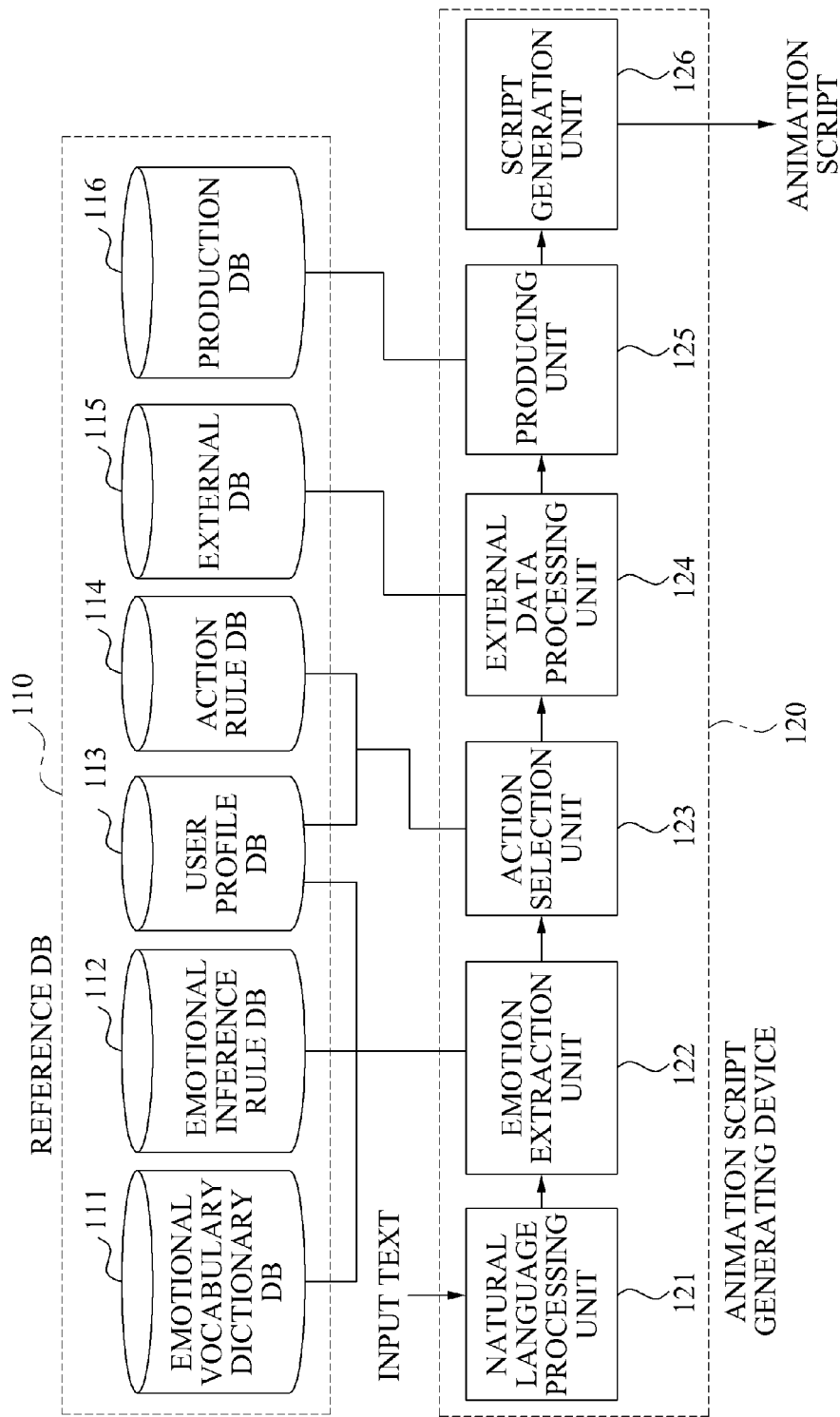
FIG. 1 is a diagram illustrating an example of an animation script generating device.

Throughout the drawings and the detailed description, unless otherwise described, the same drawing reference numerals are understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems to described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Examples described herein relate to an animation system to generate and output text-based data as an animation. The animation system may include an animation script generating device and an animation outputting device. For example, the animation script generating device may be a computer, a terminal, and the like. The animation outputting device may be a computer, a terminal, etc.

The text-based data may designate data including a text. For example, text-based data may include a Short Message Service (SMS) message, an instant message, a text memo of a Social Network Service (SNS), a text-based e-mail, and the like. The animation device may be, or may be included in a terminal, such as a mobile terminal, a computer, and the like.

FIG. 1 illustrates an example of an animation script generating device. The example animation script generating device 120 may generate text-based data as an animation script in an animation device.

Referring to the example of FIG. 1, the animation script generating device 120, to generate an animation script using a reference database 110, includes a natural language processing unit 121, an emotion extraction unit 122, a selection unit 123, an external data processing unit 124, a producing unit 125, and a script generation unit 126. The reference database 110 includes an emotional vocabulary dictionary database 111, an emotional inference rule database 112, a user profile database 113, an action rule database 114, an external database 115, and a production database 116.

The user profile database 113 may be a database that includes user relationship information. The user of the terminal may manage user profile information and character information and the user profile information and the character information may be stored in the user profile database 113. For example, the user relationship information may be information concerning a relationship-type such as a lover, a friend, a family member, and the like, and/or an intimacy degree between a user and other people which may be managed by the user. For example, those with a higher intimacy with the user may be labeled as a higher degree of intimacy, and those with lower intimacy the user may be labeled with a lower degree of intimacy.

The emotional vocabulary dictionary database 111 is a database in which mapping information of emotions based on vocabulary and user relationship information may be stored.

The emotional inference rule database 112 is a database in which mapping information of emotions based on vocabulary and user relationship information may be stored.

The action rule database 114 is a database in which mapping information of actions based on one or more emotions and user relationship information may be stored.

The external database 115 is a database in which sending and/or receiving time information of text-based data, weather information, and the like, may be stored.

The production database 116 is a database in which mapping information of camera work, background sound corresponding to at least one of the user relationship information, emotions, characters, and/or actions, may be stored.

An example of the animation script generating device 120 is described hereinafter. The natural language processing unit 121 may analyze text-based data to identify words included in the text-based data or to identify sentence elements such as a subject, a predicate, an object, and the like. For example, the data may be syntax-analyzed. Also, the text-based data may be entered by, for examples, speaking, writing, and typing.

The emotion extraction unit 122 may identify, in the user profile database 113, a character and the user relationship information corresponding to a user who generated the text-based data. The emotion extraction unit 122 may refer to the emotional vocabulary dictionary database 111 to identify an emotion corresponding to the words and the user relationship information. The emotion extraction unit 122 may identify, in the emotional inference rule database 112, an inferred emotion that is obtained by inferring an emotion based on one or more words of the text-based data and the user relationship information. Next, the emotional extraction unit 122 may combine the emotion vocabulary and the inferred emotion to extract at least one user emotion. For example, the animation script generating device may extract emotion from contents included in a message or letter, such as a text message, an email, an electronic document, and the like, and generate an animation script based on the text included in the message.

For example, when receiving text-based data "I'm annoyed because I have a lot of homework to do today, so I'm sick of preparing the presentation," emotions may be identified using the natural language processing unit 121 and the emotion extraction unit 122 may be performed as shown in the Table of FIG. 12.

Referring also to FIG. 12, for example, the natural language processing unit 121 may divide "I'm annoyed because I have a lot of homework to do today, so I'm sick of preparing the presentation" into words having sentence elements. For example, the emotion extraction unit 122 may identify the user relationship information such as a friend having an "intimacy degree 5." The emotion extraction unit 122 may identify emotion vocabulary such as "annoyed" and "sick," and identify the inferred emotion based on "homework," "a lot of," and "do," based on the user relationship information. The emotion extraction unit 122 may combine the emotion of words and the inferred emotion to extract an emotion of "contempt."

In addition, the emotion extraction unit 122 may extract emotions from the text-based to data, or extract the emotions from predetermined physiological features such as measured pulses or brain waves of a user. The physiological features may be measured through an external instrument such as a pulse meter, an electric spgygnomanometer, an electroencephalograph, and the like.

The selection unit 123 may select, from the action rule database 114, an action based on an emotion and the user relationship information. The action may include one or more of a gesture and a motion.

The external data processing unit 124 may generate a background image based on external data including at least one of sending/receiving time information of the text-based data, current time information, weather information, and the like. The external data may be stored in the external database 115. For example, the external data processing unit 124 may generate the background image as a rainy night including rainy weather and a night time background.

The producing unit 125 may verify, from the production database 116, a corresponding camera work and/or background sound based on at least one of the user relationship information, the emotion, the character, the action, and the like.

The script generation unit 126 generates an animation script including at least one of the text-based data, the emotion, the action, the background image, the background sound, and the camera work.

Referring to FIG. 1, for convenience the emotional vocabulary dictionary database 111, the emotional inference rule database 112, the user profile database 113, the action rule database 114, the external database 115, and the production database 116, are described as separate databases. However, one or more of these databases may be combined in a shared database.

Figure 2:
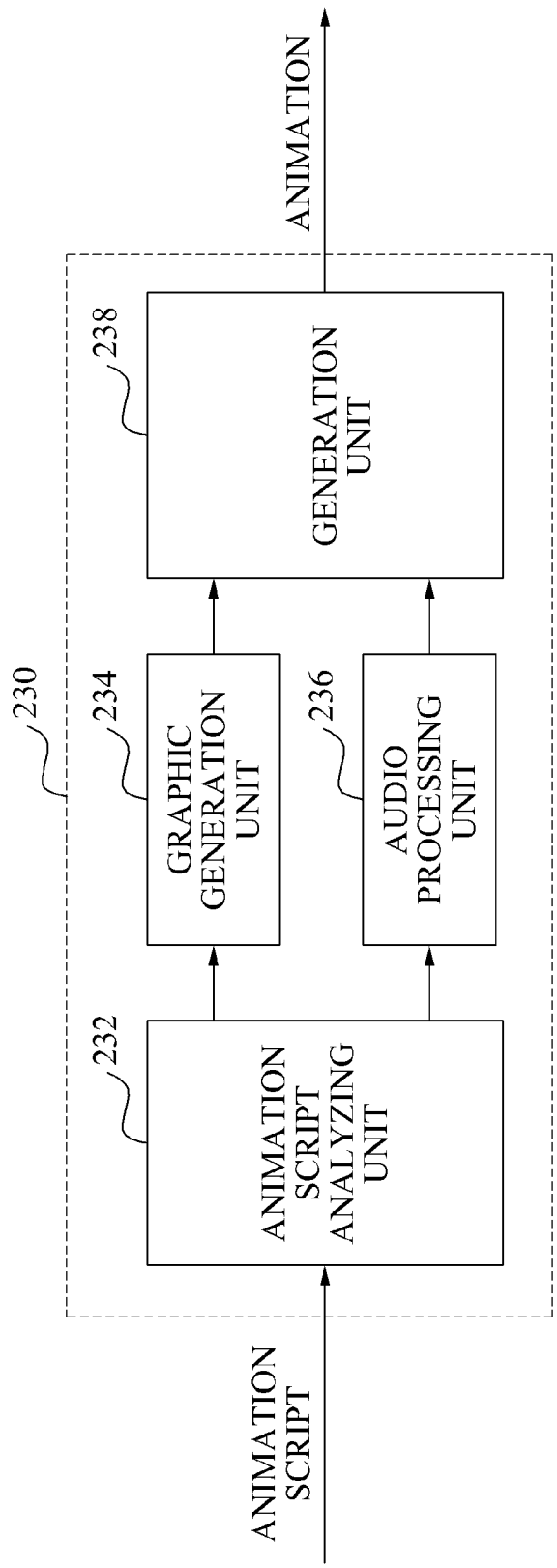
FIG. 2 is a diagram illustrating an example of an animation outputting device.

FIG. 2 illustrates an example of an animation outputting device. The example animation outputting device 230 may output an animation based on an animation script.

Referring to FIG. 2, the animation outputting device 230 includes an animation script analyzing unit 232, a graphic generation unit 234, an audio processing unit 236, and an animation generation unit 238.

The animation script analyzing unit 232 may analyze information included in the animation script to identify emotion information, character information, action information, the background image, the camera work, the background sound, and/or the text-based data.

The graphic generation unit 234 may generate a graphic in the background image based on an action of the character according to the camera work. The graphic generation unit 234 may generate the graphic including text of the text-based data.

The audio processing unit 236 may output the text-based data as a voice in which an intonation or a tone is applied according to the emotional information. The audio processing unit 236 may output the background sound. For example, a technology outputting text of the text-based data as a voice may be referred to as a Text To Speech (TTS), and the intonation or the tone may be applied differently based on the emotion information.

The animation generation unit 238 may combine the graphic generated in the graphic generation unit 234 with the voice or the background sound outputted from the audio processing unit 236 to thereby output an animation. For example, the animation may be output to a display included in the animation generating device 230.

A method for generating an animation based on text-based data in the above described animation device is described with reference to FIG. 3.

Figure 3:
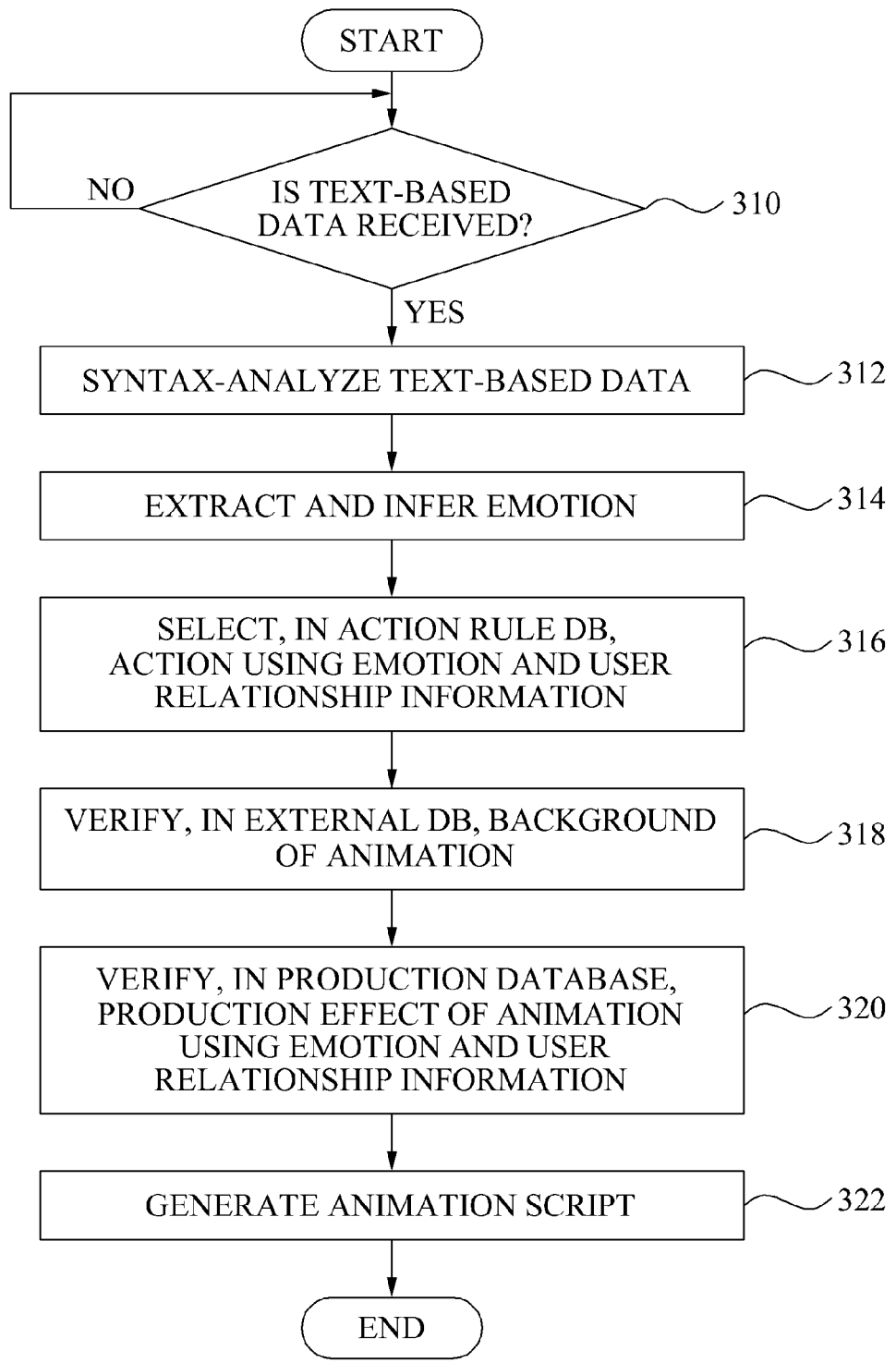
FIG. 3 is a flowchart illustrating an example of a method for generating text-based data as an animation script in an animation script generating device.

FIG. 3 illustrates an example of a method for generating text-based data as an animation script in an animation script generating device.

Referring to FIG. 1 and FIG. 3, when receiving text-based data in operation 310, the animation script generating device 120, in operation 312, analyzes the text-based data to identify one or more words and/or sentence elements included in the text-based data.

In operation 314, the animation script generating device 120 selects a character corresponding to a user that generated the text-based data, and extracts, from the reference database 110, an emotion corresponding to one or more words and/or sentence elements based on the user relationship information.

In operation 316, the animation script generating device 120 identifies, in the reference database 110, an action corresponding to the emotion and the user relationship information.

In operation 318, the animation script generating device 120 generates a background image based on, for example, at least one of sending time information of the text-based data, receiving time information of the text-based data, current time information, weather information, and the like.

In operation 320, the animation script generating device 120 identifies from the reference database 110, a corresponding camera work and background sound using at least one of the user relationship information, the emotion, the character, and the action. In operation 322, the animation script generating device 120 combines one or more of the text-based data, the emotion, the action, the background image, the background sound, and the camera work, to generate an animation script.

Figure 4:
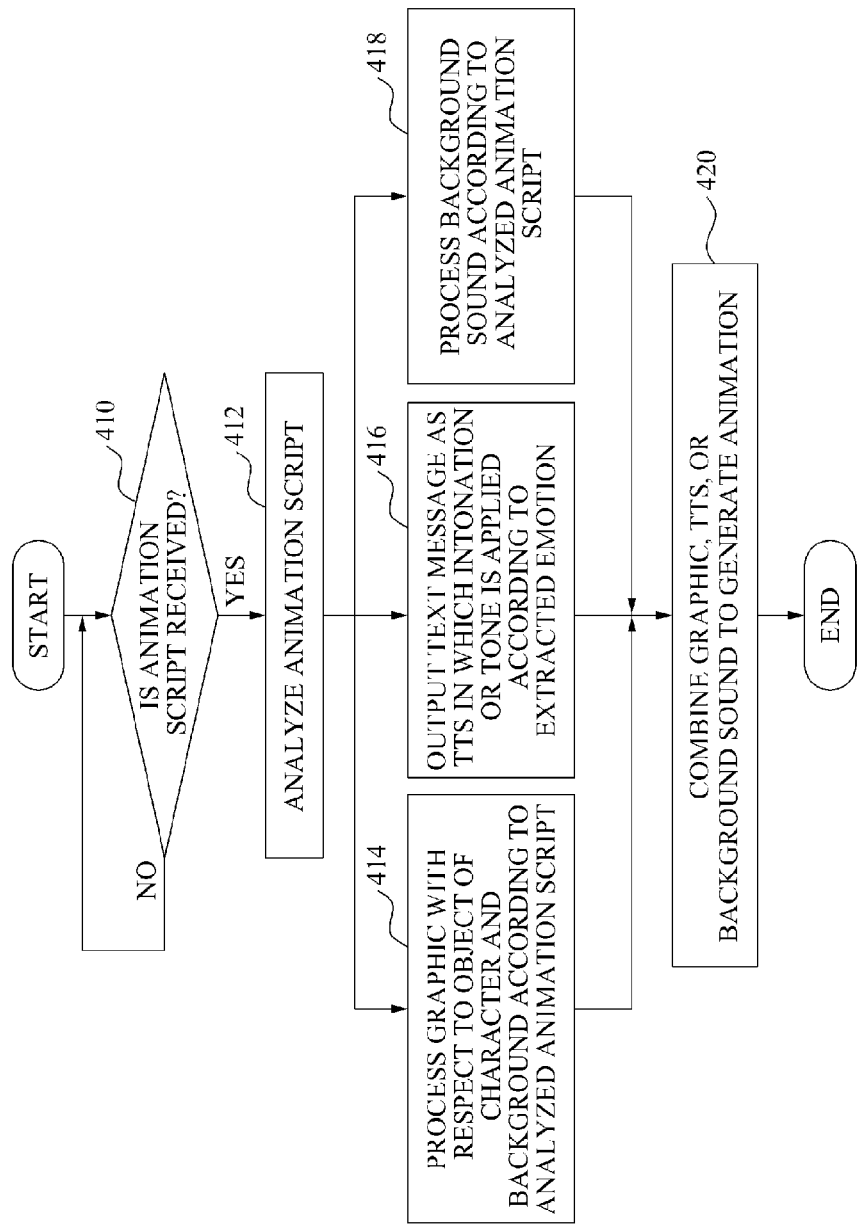
FIG. 4 is a flowchart illustrating an example of a method for generating an animation script in an animation outputting device.

FIG. 4 illustrates an example of a method for generating an animation script in an animation outputting device.

Referring to FIG. 2 and FIG. 4, when receiving an animation script in operation 410, the animation generating device 230, in operation 412, analyzes information included in an animation script to identify emotion information, character information, action information, a background image, a camera work, a background sound, and/or text-based data.

In operation 414, the animation outputting device 230 generates, in the background image, a graphic including an action of the character based on the camera work. At the same time, in operation 416, the animation outputting device 230 outputs a text of the text-based to data as a voice in which an intonation or a tone is applied based on the emotion information, and in operation 418, outputs the background sound.

In operation 420, the animation outputting device 230 combines the generated graphic with the voice or the background sound to output an animation.

The animation script generating device 120 and the animation outputting device 230, described with reference to FIGS. 1 and 2, may be included in a sending terminal and/or in a receiving terminal, and may be constructed as a separate external device, which is different from the sending/receiving terminal. For example, the animation script generating device 120 may be included in a server, such as a service provider for a mobile device.

Example implementations in which the above described animation system is applied in a handheld terminal is described with reference to FIGS. 5 through 7.

Figure 5:
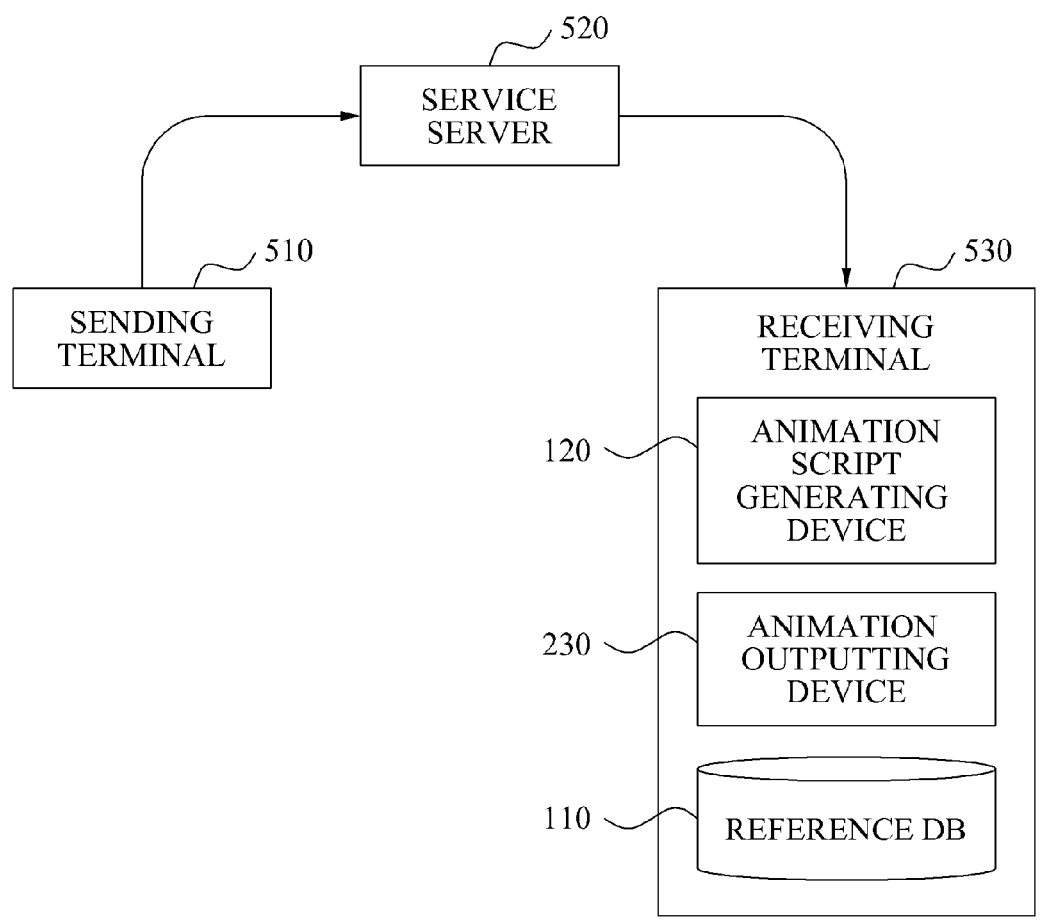
FIG. 5 is a diagram illustrating an example in which an animation device is included in a receiving terminal.

FIG. 5 illustrates an example in which an animation system is included in a receiving terminal.

Referring to FIG. 5, when a sending terminal 510 sends the text-based data to the receiving terminal 530 through a service server 520, the receiving terminal 530 may generate the text-based data as an animation script using the animation script generating device 120, and the generated animation script may be generated as animation using the animation outputting device 230.

For example, the animation script generating device 120 may extract an emotion of a SMS message based on user relationship information stored in the reference database 110, and identify an action.

In some embodiments, because the animation script is generated based on the user relationship information classified in a point of view of the receiving terminal 530, the animation script may be different from an animation script intended to be sent by the sending terminal 510.

However, the receiving terminal 530 may output general text data as an animation.

Figure 6:
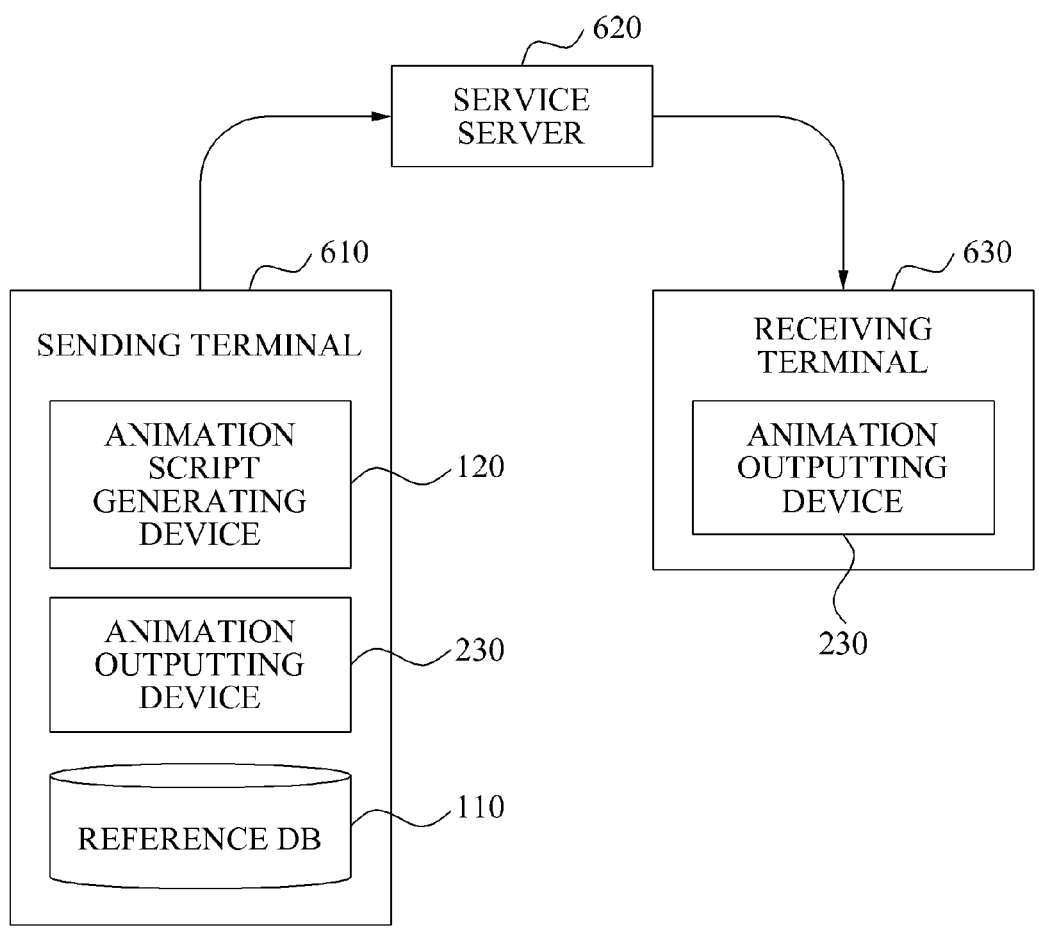
FIG. 6 is a diagram illustrating an example in which an animation device is included in a sending terminal and a receiving terminal.

FIG. 6 illustrates an example in which an animation device is included in a sending terminal 610 and a receiving terminal 630.

Referring to FIG. 6, the sending terminal 610 may generate an animation script based on, for example, a SMS message, an email, and the like, using the animation script generating device 120. The sending terminal 610 may send the generated animation script to the receiving terminal 630 through a server 620. The sending/receiving terminal may be included in a network, for example, a wired network, a wireless network, or a combination thereof. Also, the sending terminal 610 may generate an animation based on the generated animation script using the animation outputting device 230.

For example, the animation script generating device 120 may extract an emotion of the SMS message based on user relationship information stored in the reference database 110, and select an action. The animation script generating device 120 may extract emotions from the SMS message, or extract the emotions through a predetermined physiological measurement such as measuring a pulse or brain waves of a user.

Because the animation script is generated based on the user relationship information classified in a point of view of the sending terminal 610, the animation generated in the receiving terminal 630 is an animation intended to be sent by the sending terminal 610.

However, the sending terminal 610 may send, to the receiving terminal 630, an animation script having greater capacity than that of the general text data.

Figure 7:
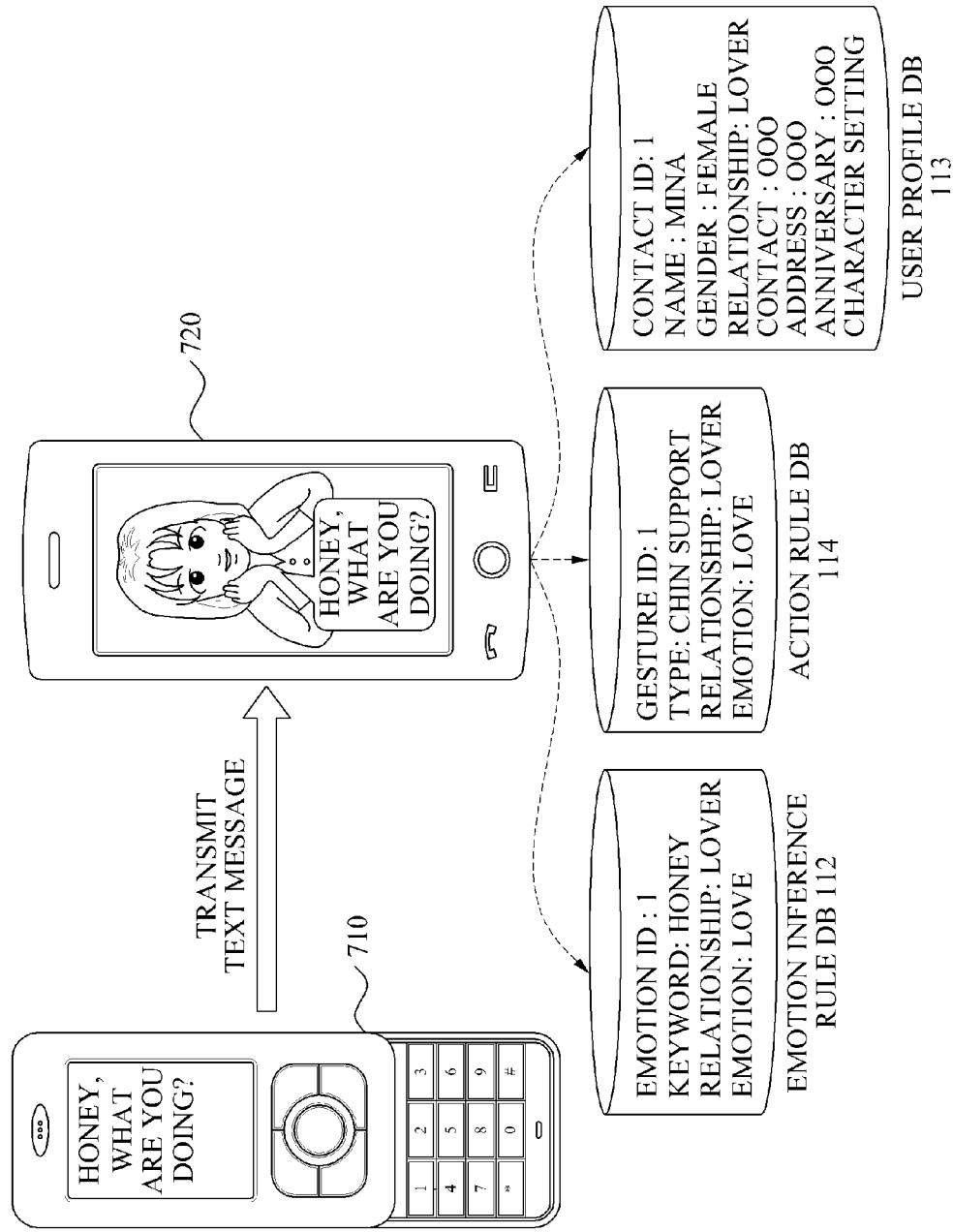
FIG. 7 is a diagram illustrating an example of generating text-based data as an animation.

FIG. 7 illustrates an example of generating text-based data as an animation. In the example of FIG. 7, a receiving terminal 710 including an animation device receives text-based data and outputs the received text-based data as an animation.

Referring to FIG. 7, similar to FIG. 6, the receiving terminal 720 includes the animation script generating device 120 and the animation outputting device 230.

As shown in the example of FIG. 7, the sending terminal 710 sends a SMS message "Honey, what are you doing?" to the receiving terminal 720. In this example, using the animation script generating device 120, the receiving terminal 720 may identify, in the user profile database 113, "lover" of user relationship information, extract, through the emotional inference rule database 112, an emotion of "love," and select, from the action rule database 114, an action of "chin support." Next, the receiving terminal 720 may output an animation using the animation outputting device 230.

Figure 8:
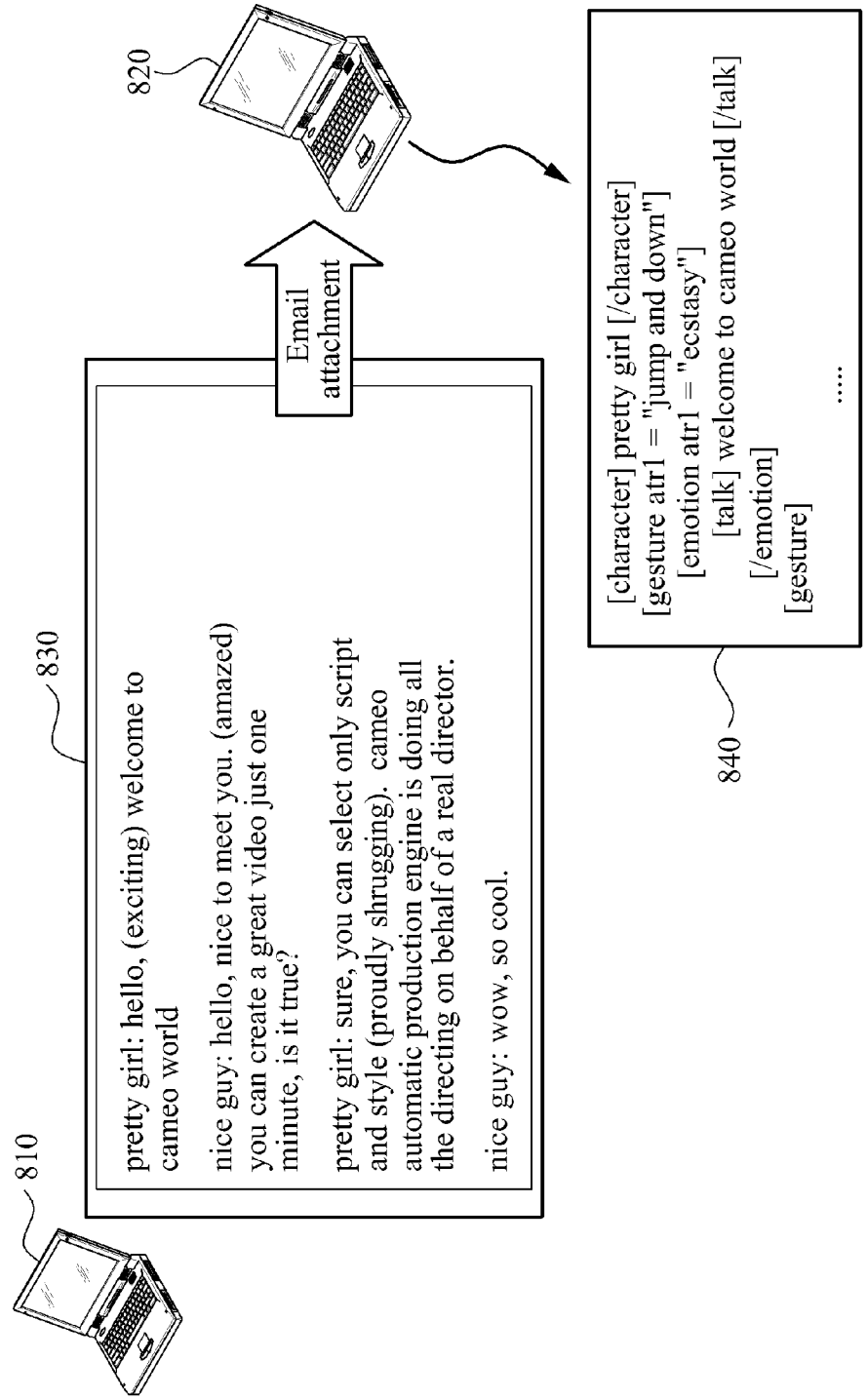
FIG. 8 is a diagram illustrating another example of generating text-based data as an animation.

FIG. 8 illustrates another example of generating text-based data as an animation. In FIG. 8, similar to FIG. 6, a receiving terminal 820 includes the animation script generating device 120 and the animation outputting device 230.

Referring to FIG. 8, a sending terminal 810 sends, to the receiving terminal 820, a text scenario 830 (for example, User Created Contents: (UCC)), e-mail, SMS, and the like) including contents generated as moving pictures by a user. In this example, the text scenario 830 may be sent through an e-mail, a blog sharing moving pictures generated by a user, a moving picture-related site, and the like.

The animation script generating device 120 of the receiving terminal 820 receiving the text scenario 830 may extract an emotion from a dialogue and a stage direction based on a content of the text scenario 830. The emotion may be stored in the emotional inference rule database 112. For example, an emotion of "ecstasy" may be extracted from a dialogue of "welcome to a cameo world" of the text scenario 830.

Also, the animation script generating device 120 of the receiving terminal 820 may select an action from the dialogue and the stage direction based on the content of the text scenario 830. The action may refer to an action stored in the rule database 114. For example, an action of "jump and down" may be selected from "exciting" of a stage direction of to the text scenario 830.

The animation script generating device 120 of the receiving terminal 820 may generate an animation script 840 including the extracted emotion and the selected action. Next, the animation outputting device 230 of the receiving terminal 820 may output the animation script 840 as an animation.

Figure 9:
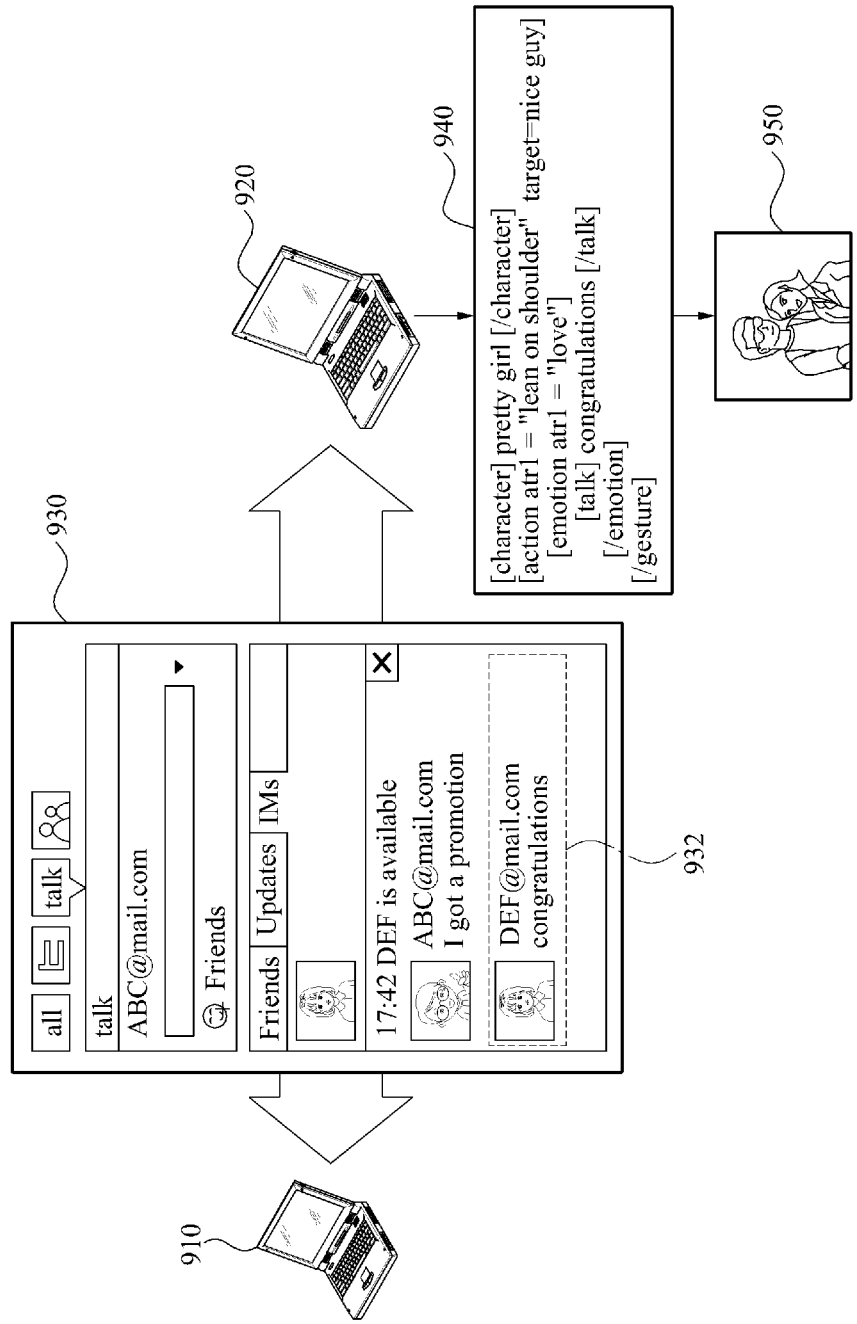
FIG. 9 is a diagram illustrating another example of generating text-based data as an animation.

Referring to the example shown in FIG. 9, a sending terminal 910 sends an instant message 932 to the receiving terminal 920 using an instant messenger 930.

Referring to the example shown in FIG. 9, a sending terminal 910 sends an instant message 932 to the receiving terminal 920 using an instant messenger 930. In this example, the text scenario 830 may be sent through an e-mail.

The animation script generating device 120 of the receiving terminal 920 receiving the instant message 932 may identify a sender of the instant message 932 in the user profile database 113, and verify user relationship information based on the identified sender.

In this example, the animation script generating device 120 of the receiving terminal 920 may extract, from the emotional inference rule database 112, an emotion of "love," and select an action of "lean on shoulder" based on the action rule database 114.

The animation script generating device 120 of the receiving terminal 920 may generate an animation script 940 including the extracted emotion and the selected action. Also, the animation script 940 may be outputted as an animation 950 using the animation outputting device 230, as shown in FIG. 9.

Figure 10:
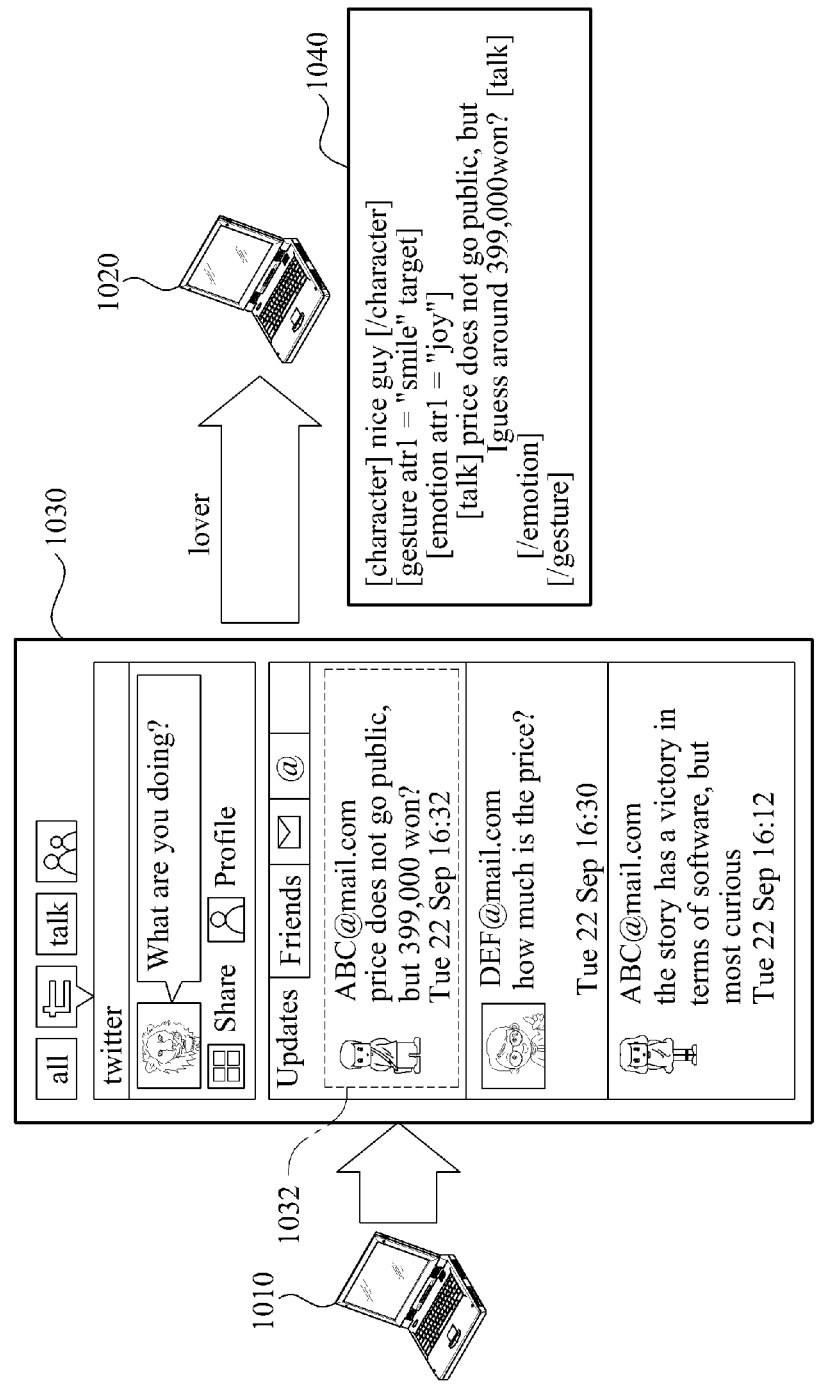
FIG. 10 is a diagram illustrating another example of generating text-based data as an animation.

FIG. 10 illustrates another example of generating text-based data as an animation. In FIG. 10, similar to FIG. 6, a receiving terminal 1020 includes the animation script generating device 120 and the animation outputting device 230.

Referring to FIG. 10, a sending terminal 1010 may input, in a Social Network Service (SNS) 1030, a memo of a user as a text memo 1032. When a user of the receiving terminal 1020 selects that the text memo 1032 be displayed as an animation, the animation script generating device 120 of the receiving terminal 1020 may retrieve, in the user profile database 113, a user profile of the user that inputs the text memo 1032, and identify user relationship information.

In this example, the animation script generating device 120 of the receiving terminal 1020 may extract an emotion of "joy" from "^^" included in the text memo 1032. The emotion may be included in the emotion inference rule database 11. Also, the animation script generating device 120 of the receiving terminal 1020 may select, from the action rule database 114, an action of "slightly smile."

The animation script generating device 120 of the receiving terminal 1020 may generate an animation script 1040 including the extracted emotion and the selected action. Also, the animation script 1040 may be outputted as an animation using the animation outputting device 230, as shown in FIG. 10.

Figure 11:
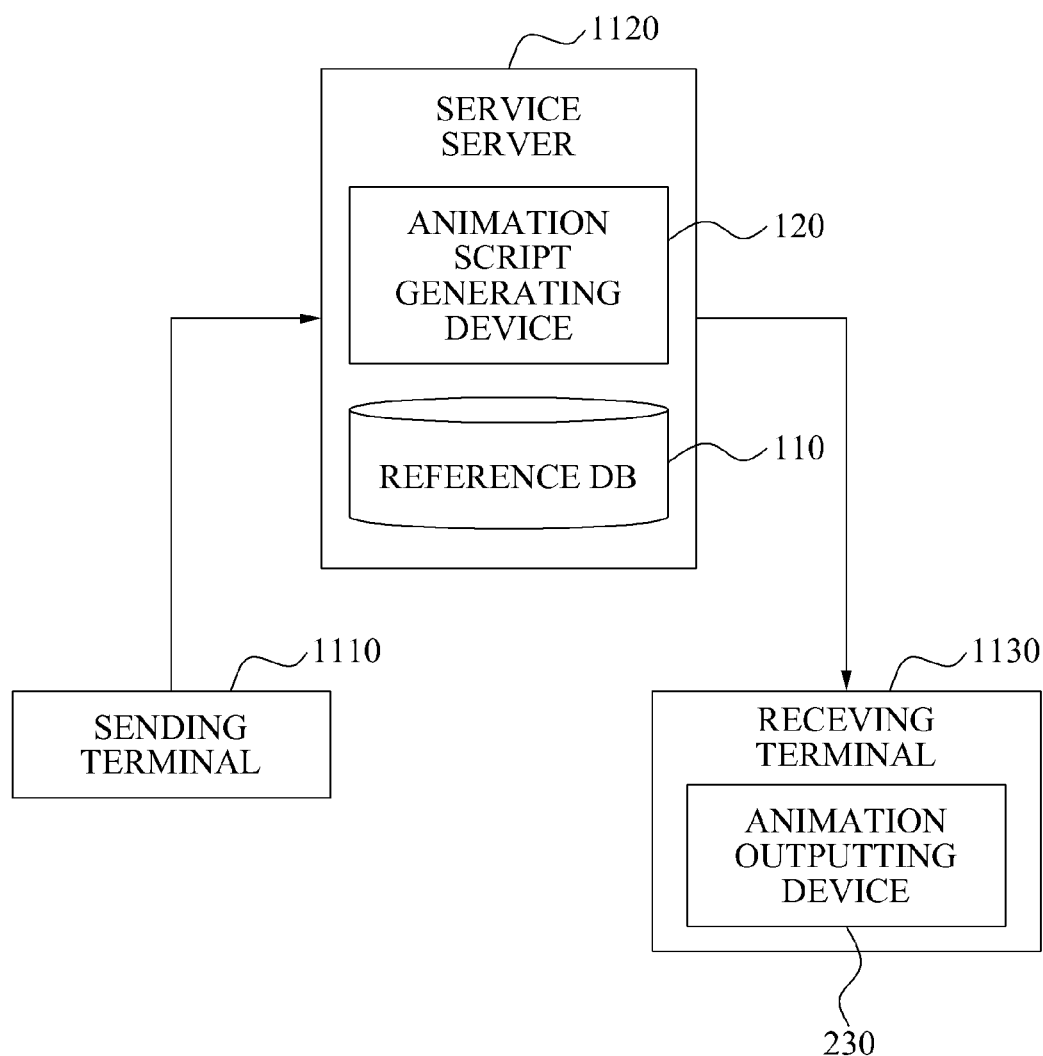
FIG. 11 is a diagram illustrating an example in which an animation system is applied to a service server and a receiving terminal.

FIG. 11 is a diagram illustrating an example in which an animation system is applied to a service server 1120 and a receiving terminal.

Referring to FIG. 11, when receiving text-based data from a sending terminal 1110, the service server 1120 may generate the text-based data as an animation script using the animation script generating device 120.

The service server 1120 may transmit the generated animation script to a receiving terminal 1130.

In response, the receiving terminal 1130 may output the received animation script using the animation outputting device 230.

The animation script generating device 120 may extract an emotion of the text-based data based on user relationship information stored in the reference database 110, and identify one or more actions based on the user relationship data. When the reference database 110 is positioned in the service server 1120, the reference database 110 may store the user relationship information for each user.

Accordingly, the animation script generating device 120 may generate, in accordance with one or more predetermined settings, the animation script based on the user relationship information classified in terms of the sending terminal 1110, and/or based on the user relationship information classified in terms of the receiving terminal 1130.

According to above-described examples, there is provided an animation system and methods for outputting text-based data as an animation. The device may extract an emotion from text-based data, select an action based on the emotion and on user relationship information to generate an animation script, generate an animation based on the animation script, and output the text-based data as an animation including the emotion and action. The user relationship information may include information about a relationship between the user of the device and a user from whom the text-based data is received.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal or terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), a setup box, and the like capable of wireless communication or communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An animation script generating device, comprising:
a processor configured to execute instructions for an emotion extractor configured to identify, from a user profile database, a character corresponding to a generator of text-based data and user relationship information, the text-based data being analyzed to identify words, sentence elements, or any combination thereof in the text-based data, and the user relationship information indicating a relationship between the generator of the text-based data and a receiver of the text-based data, and extract a user emotion based on the text-based data and the user relationship information;
a selector configured to select an action based on the extracted user emotion; and
a script generator configured to generate an animation script by combining the text-based data with the extracted user emotion and the action, the generated animation script being configured for an input to a terminal that uses an animation outputting device to generate an animation based on the generated animation script,
wherein the animation script is generated using a reference database, the reference database comprising a production database configured to store mapping information of at least one of a camera work and a background sound.

2. The animation script generating device of claim 1, wherein the text-based data comprises at least one of a Short Message Service (SMS) message, a text scenario comprising contents to be generated as moving pictures, an instant message, a text memo of a Social Network Service (SNS), and a text-based e-mail.

3. The animation script generating device of claim 1, further comprising:
 a natural language processor configured to process words included in the text-based data based on the analyzed text-based data.

4. The animation script generating device of claim 1, further comprising:
 an external data processor configured to generate a background image using at least one of transmittal time information of the text-based data, reception time information of the text-based data, current time information, and weather information,
 wherein the script generator is further configured to generate the animation script comprising the background image.

5. The animation script generating device of claim 1, wherein the user profile database configured to store mapping information of the user relationship information corresponding to the generator of the text-based data and mapping information of a character corresponding to the receiver of the text-based data.

6. The animation script generating device of claim 1, wherein the selector is further configured to select, from the action rule database, the action based on the extracted emotion and the user relationship information.

7. The animation script generating device of claim 1, wherein at least one of the camera work and the background sound, correspond to at least one of the user relationship information, the extracted emotion, the character, the action, or any combination thereof.

8. The animation script generating device of claim 7, further comprising:
 an information producer configured to identify at least one of the camera work, or the background sound, in the production database, based on at least one of the user relationship information, the extracted emotion, the character, the action, or any combination thereof,
 wherein the script generator is further configured to generate the animation script using at least one of the camera work, and the background sound.

9. The animation script generating device of claim 1, wherein the user relationship information comprises the relationship and an intimacy degree between the generator of the text-based data and the receiver of the text-based data.

10. The animation script generating device of claim 1, wherein the emotion extractor is further configured to extract the emotion based on a predetermined physiological feature of the generator of the text-based data.

11. The animation script generating device of claim 1, wherein the emotion extractor is configured to:
 identify, from an emotional vocabulary dictionary database, an emotion based on the text-based data and the user relationship information,
 identify, from an emotional inference rule database, an inferred emotion based on the text-based data and the user relationship information, and
 extract the user emotion using at least one of the emotion and the inferred emotion.

12. The animation script generating device of claim 1, wherein the user relationship information is pre-stored in the user profile database, and
 wherein the animation script is generated using a reference database, the reference database comprising at least one of:
 an emotional vocabulary dictionary database configured to store mapping information of the emotion corresponding to the text-based data and the user relationship information;
 an emotional inference rule database configured to store mapping information of the inferred emotion corresponding to the text-based data and the user relationship information; and
 an action rule database configured to store mapping information of an action corresponding to at least one of the extracted emotion and the user relationship information.

13. An animation outputting device, comprising:
 an analyzer configured to analyze information included in an animation script to identify emotional information, a character corresponding to a generator of text-based data, action information, and the text-based data, the animation script configured as having been generated by identifying an emotion based on an analysis of the text-based data and user relationship information indicating a relationship between the generator of the text-based data and a receiver of the text-based data;
 a graphic generator configured to generate a graphic in which the character moves based on the action information;
 an audio processor configured to output the text-based data as a voice in which an intonation or a tone is applied based on the emotional information; and
 an animation generator configured to output the generated graphic in a terminal that comprises the animation outputting device and an animation script generating device that generates the animation script, and configured to combine and output the generated graphic and the voice as an animation,
 wherein the animation script is configured as having been generated using a reference database, the reference database comprising a production database configured to store mapping information of at least one of a camera work and a background.

14. The animation outputting device of claim 13, wherein the text-based data comprises at least one of a SMS message, a text scenario including contents to be generated as moving pictures, an instant message, a text memo of a SNS, and a text-based e-mail.

15. The animation outputting device of claim 13, wherein the graphic generator is further configured to generate the graphic comprising a text of the text-based data.

16. The animation outputting device of claim 13, further comprising:
 an audio processor configured to output a background sound in response to the analyzer identifying the background sound from the animation script,
 wherein the animation generator is further configured to combine the generated graphic and the background sound to output the animation.

17. The animation outputting device of claim 13, wherein the generation of the graphic in which the character moves based on the action information is performed at the same time as the outputting of the text-based as the voice in which the intonation or the tone is applied.

18. A receiving terminal, comprising:
 a processor configured to execute instructions to store user relationship information, character information, and emotional information for a reference database in a memory;

an animation script generator configured to
analyze text-based data to identify words, sentence elements, or any combination thereof in the text-based data,
identify, from a user profile database, the user relationship information indicating a relationship between a generator of the text-based data and a receiver of the text-based data,
extract a user emotion based on the text-based data and the user relationship information,
select an action based on the extracted user emotion, and
generate an animation script by combining the text-based data with the extracted emotion and the action; and
an animation generator configured to generate an animation based on the generated animation script to a display,
wherein the reference database comprising a production database configured to store mapping information of at least one of a camera work and a background sound.

19. The receiving terminal of claim 18, wherein the text-based data comprises at least one of a SMS message, a text scenario comprising contents to be generated as moving pictures, an instant message, a text memo of a SNS, and a text-based e-mail.

20. The receiving terminal of claim 18, wherein the animation generator is further configured to analyze the animation script to output the animation to a display.

21. The receiving terminal of claim 18, wherein the user profile database configured to store mapping information of the user relationship information corresponding to the generator of the text-based data and mapping information of a character corresponding to the receiver of the text-based data.

22. The receiving terminal of claim 18, wherein the animation script generator further comprises:
an external data processor configured to generate a background image using at least one of transmittal time information of the text-based data, reception time information of the text-based data, current time information, and weather information,
wherein a script generator is configured to generate the animation script comprising the background image.

23. The receiving terminal of claim 22, wherein the external data processor is further configured to generate the background image using at least two of the transmittal time of the text-based data, the reception time information of the text-based data, the current time information, and the weather information.

24. The receiving terminal of claim 18,
wherein at least one of the camera work and the background sound correspond to at least one of the user relationship information, the extracted emotion, the character, the action, or any combination thereof.

25. The receiving terminal of claim 24, wherein the animation script generator generating device further comprises:
an information producer configured to verify at least one of the camera work, or the background sound, in the production database, using at least one of the user relationship information, the extracted emotion, the character, the action, or any combination thereof; and
a script generator configured to generate the animation script using at least one of the camera work and the background sound.

26. The receiving terminal of claim 18, wherein the user relationship information classified from the point of view of the receiving terminal.

27. A sending terminal, comprising:
a processor configured to store user relationship information, character information, and emotional information for a reference database in a memory;
an animation script generator configured to
analyze text-based data to identify words, sentence elements, or any combination thereof in the text-based data,
identify, from a user profile database, the user relationship information indicating a relationship between a generator of the text-based data and a receiver of the text-based data,
extract a user emotion based on the text-based data and the user relationship information,
select an action based on the extracted emotion;
generate an animation script by combining the text-based data with the extracted emotion and the action; and
an animation generator configured to generate an animation based on the generated animation script to a display,
wherein the reference database comprising a production database configured to store mapping information of at least one of a camera work and a background sound.

28. The sending terminal of claim 27, wherein the text-based data comprises at least one of a SMS message, a text scenario comprising contents to be generated as moving pictures, an instant message, a text memo of a SNS, and a text-based e-mail.

29. The sending terminal of claim 27, wherein the user profile database configured to store mapping information of the user relationship information corresponding to the generator of the text-based data and mapping information of a character corresponding to the receiver of the text-based data.

30. The sending terminal of claim 27, wherein the animation script generator further comprises:
an external data processor configured to generate a background image using at least one of sending time information of the text-based data, receiving time information of the text-based data, current time information, and weather information,
wherein a script generator is configured to generate the animation script comprising the background image.

31. The sending terminal of claim 27,
wherein at least one of the camera work and the background sound, correspond to at least one of the user relationship information, the extracted emotion, the character, the action, or any combination thereof.

32. The sending terminal of claim 31, wherein the animation script generator further comprises:
an information producer configured to verify at least one of the camera work or the background sound, in the production database, using at least one of the user relationship information, the extracted emotion, the character, the action, or any combination thereof; and
a script generator configured to generate the animation script using at least one of the camera work and the background sound.

33. The sending terminal of claim 27, wherein the user relationship information classified from a point of view of the sending terminal.

34. The sending terminal of claim 27, wherein the user relationship information classified from a point of view of the sending terminal that is different from a user relationship information classified from a point of view of a receiving terminal.

35. A mobile terminal configured to generate an animation based on text-based data, the mobile terminal comprising:
- a processor configured to execute instructions for an emotion extractor configured to
  - identify, from a user profile database, relationship information indicating a relationship between a generator of the text-based data and a receiver of the text-based data, the text-based data being analyzed to identify words, sentence elements or any combination thereof in the text-based data,
  - extract a user emotion based on the text-based data and the user relationship information;
- a selector configured to select an action based on the extracted user emotion; a script generator configured to generate an animation script by combining the text-based data with the extracted emotion and the action; and
- an animation outputting device configured to generate an animation based on the generated animation script, wherein the animation script is generated using a reference database, the reference database comprising a production database configured to store mapping information of at least one of a camera work and a background sound.

36. An animation script generating method, comprising:
- analyzing text-based data to identify words, sentence elements, or any combination thereof in the text-based data;
- identifying, from a user profile database, user relationship information indicating a relationship between a generator of the text-based data and a receiver of the text-based data;
- extracting a user emotion based on the text-based data and the user relationship information;
- selecting an action from a reference database based on the extracted emotion; and
- generating an animation script by combining the text-based data with the extracted emotion and the action for an input in a terminal including an animation outputting device that generates an animation based on the generated animation script, wherein the animation script is generated using a reference database, the reference database comprising a production database configured to store mapping information of at least one of a camera work and a background sound.

37. An animation outputting method in a terminal, comprising:
- analyzing information included in an animation script, generated by an animation script generating device of the terminal, to identify emotional information, a character corresponding to a generator of text-based data, action information, and the text-based data, the animation script being generated by identifying an emotion based on an analysis of the text-based data and user relationship information indicating a relationship between the generator of the text-based data and a receiver of the text-based data;
- generating a graphic, by an animation outputting device of the terminal, in which the character moves based on the action information;
- outputting the text-based data as a voice in which an intonation or a tone is applied based on the emotional information, the emotional information being identified based on the user relationship information; and
- outputting the generated graphic as an animation to a display of the terminal, wherein the outputting of the generated graphic as the animation comprises combining the generated graphic and the voice to output the animation, and wherein the animation script is generated using a reference database, the reference database comprising a production database configured to store mapping information of at least one of a camera work and a background.

* * * * *